United States Patent [19]
Meinander

[11] Patent Number: 5,861,052
[45] Date of Patent: Jan. 19, 1999

[54] APPARATUS AND PROCESS FOR PUMPING AND SEPARATING A MIXTURE OF GAS AND LIQUID

[75] Inventor: Paul Olof Meinander, Grankulla, Finland

[73] Assignee: POM Technology Oy AB, Helsingfors, Finland

[21] Appl. No.: 666,390

[22] PCT Filed: Dec. 21, 1994

[86] PCT No.: PCT/FI94/00578

§ 371 Date: Jun. 19, 1996

§ 102(e) Date: Jun. 19, 1996

[87] PCT Pub. No.: WO95/17235

PCT Pub. Date: Jun. 29, 1995

[30] Foreign Application Priority Data

Dec. 23, 1993 [FI] Finland ..................... 935853

[51] Int. Cl.⁶ .................. B01D 19/00; D21D 5/26; F04D 7/04
[52] U.S. Cl. .................. 95/243; 95/241; 95/261; 96/216; 96/196; 55/459.1; 55/409; 210/188; 494/900; 162/190; 162/55
[58] Field of Search .................. 962/190, 55; 96/214, 96/215, 216, 196, 195, 194; 95/243, 241, 261, 266; 55/409, 459.1, 400; 210/188; 415/204, 182.1, 169.1; 494/35, 900

[56] References Cited

U.S. PATENT DOCUMENTS

| | | | |
|---|---|---|---|
| 2,278,397 | 2/1942 | Scheibe et al. | 96/217 |
| 2,575,568 | 11/1951 | Topanelian, Jr. | 96/217 |
| 3,203,354 | 8/1965 | Pedersen | 415/169.1 |
| 3,323,465 | 6/1967 | Stillebroer | 415/204 |
| 3,597,904 | 8/1971 | Jakobsson et al. | |
| 3,856,483 | 12/1974 | Rumpf et al. | 95/243 |
| 3,942,961 | 3/1976 | Holliday et al. | 96/215 |
| 3,973,930 | 8/1976 | Burgess. | |
| 4,049,401 | 9/1977 | Smith | 55/184 |
| 4,201,555 | 5/1980 | Tkach | 95/15 |

(List continued on next page.)

FOREIGN PATENT DOCUMENTS

| | | |
|---|---|---|
| 0298442 | 7/1988 | European Pat. Off. . |
| 0330387 | 2/1989 | European Pat. Off. . |
| 0337394 | 4/1989 | European Pat. Off. . |
| 0430636 | 11/1990 | European Pat. Off. . |
| 0 404 647 | 5/1995 | European Pat. Off. . |
| 0 481 598 | 5/1996 | European Pat. Off. . |
| 75912 | 8/1988 | Finland . |
| 327129 | 8/1970 | Sweden . |
| 1257173 | 12/1968 | United Kingdom . |
| 96/00542 | 1/1986 | WIPO . |
| 9013344 | 11/1990 | WIPO . |
| 9203613 | 3/1992 | WIPO . |
| 9301875 | 2/1993 | WIPO . |
| 9323135 | 11/1993 | WIPO . |
| 9323612 | 11/1993 | WIPO . |
| 9417242 | 8/1994 | WIPO . |

Primary Examiner—Stanley S. Silverman
Assistant Examiner—Jose A. Fortuna
Attorney, Agent, or Firm—Browdy and Neimark

[57] ABSTRACT

A process and apparatus for pumping a fluid mixture of a gas and a liquid and for separating said gas and liquid from each other, said apparatus having a fluid inlet (14) at one end (18) and at the opposite end (22) a pump housing (16) with a liquid outlet (28) and, between said inlet (14) and said pump housing (16), a hollow elongated gas separation part (30) of an essentially circular cross section with a generally central outlet (26) for separated gas. Said gas separation part (30) is provided by a hollow rotor (12) between said inlet (14) and said pump housing (16), the inner wall of said rotor (12) providing a large rotatable gas separation surface (32). The diameter of said rotor (12) increases at said opposite end (22) of the apparatus to form a larger diameter pumping zone (17) extending into said pump housing (16). Said rotor (12) is provided with a blade wheel (24) extending into said pump housing (16). The apparatus is especially well suited for the gas-free re-cycling of backwater drained through a forming fabric in a papermaking process. The invention is also applicable to the removal of air from fluid materials separated by flotation.

18 Claims, 4 Drawing Sheets

U.S. PATENT DOCUMENTS

| | | | |
|---|---|---|---|
| 4,273,562 | 6/1981 | Niskanen | 55/52 |
| 4,362,536 | 12/1982 | Gullichsen | 95/261 |
| 4,410,337 | 10/1983 | Gullichsen et al. | 95/22 |
| 4,435,193 | 3/1984 | Gullichsen et al. | 95/19 |
| 4,443,331 | 4/1984 | Saint Amand | 209/210 |
| 4,600,413 | 7/1986 | Sugden | 55/207 |
| 4,675,033 | 6/1987 | Fellman et al. | 96/216 |
| 4,908,048 | 3/1990 | Hofmann et al. | 96/196 |
| 4,976,586 | 12/1990 | Richter et al. | 415/143 |
| 5,034,099 | 7/1991 | Nilsson | 162/261 |
| 5,039,320 | 8/1991 | Hoglund et al. | 96/214 |

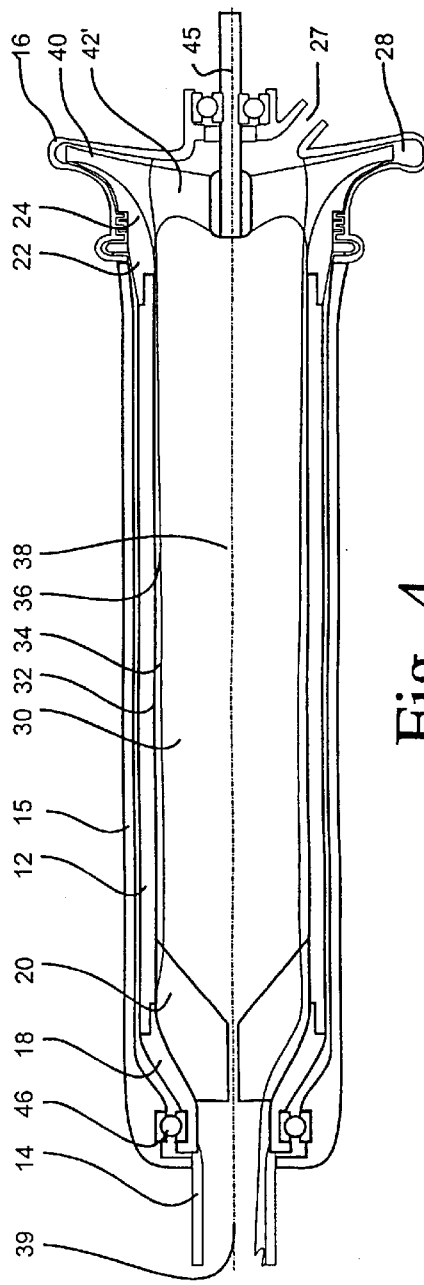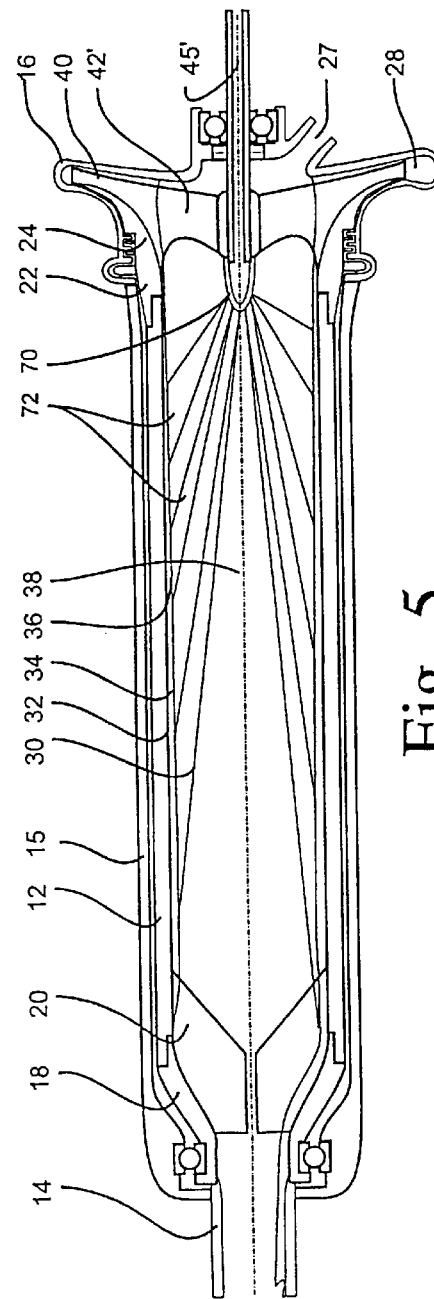

APPARATUS AND PROCESS FOR PUMPING AND SEPARATING A MIXTURE OF GAS AND LIQUID

FIELD OF THE INVENTION

The present invention relates to an apparatus and a process for separating a gas such as air from a liquid or a liquid suspension such as water or papermaking stock in connection with pumping said liquid. The invention also relates to the use of the apparatus for pumping backwater draining through a forming fabric of a paper machine, for pumping fluid material separated by flotation and for removing air from papermaking stock.

REVIEW OF THE RELATED TECHNOLOGY

In many cases gas enclosed or generated in a fluid to be pumped causes problems. For example, when pumping fluids containing gas with a conventional centrifugal pump, the gas disturbs the pumping. The gas separating from the fluid under the influence of the centrifugal forces in the pumping chamber forms a gradually growing gas bubble, which decreases the power of the pump until the bubble finally is discharged. In processes requiring a constant flow such irregular function causes great disturbances.

As an example backwater drained through a forming fabric in a papermaking process, normally, contains a large amount of enclosed air. Since the short circulation of a papermachine requires a particularly constant flow, disturbing air is normally removed by conducting the drained backwater, by means of special pipe or channel systems, from the dewatering box or boxes to an open backwater tank, from where it is pumped back to the fiber process of the short circulation preceding sheet forming.

Air contained in thin stock of a papermaking process also disturbs the stability of flow in the short circulation and disturbs the forming of a paper sheet by causing voids or holes in the sheet and by retarding the drainage of water.

For the above reasons it is particularly important for the paper forming process to have an efficient deaeration of the drained backwater. Consequently, backwater tanks and other parts of the system are traditionally designed for very low flow speeds in order to provide sufficient time for the enclosed air to emerge and be removed before the backwater is pumped into the closed part of the short circulation. It is also common to incorporate separate deaeration devices into the short circulation in order to remove air which has not been removed from the back water or brought into the short circulation together with the stock.

Due to slow flow speeds, the recycling of backwater into the fiber process takes a significantly extended time, which in turn retards the reaching of a new equilibrium state after process changes, such as a change of the paper grade. In addition thereto the slow flow speeds cause dirt buildup in tanks and pipings due to deposit therein of dispersed material and because of biological activity.

In cases where flotation is used for separating materials, such as in connection with de-inking of recycled wastepaper or the recovery of fibers from the long circulation in a paper machine, air separation, defoaming and pumping are particularly difficult and mostly require separate defoaming or settling tanks.

Pumps, which are able to separate gas from a fluid to be pumped are well known as such, but the objective of such pumps is normally just to remove a sufficient portion of the gas to enable regular pumping. The known pumps are normally not capable of removing enough gas for achieving the degree of freedom of air, which is required for using the fluid directly for example in a papermaking process without further deaeration. Deaerating pumps have also been designed for the treatment of fiber suspensions with a rather high solids content and high viscosity. In such pumps the separation of gas is generally caused by high shear forces required for fluidizing the highly viscous fluid which is to be pumped.

Examples of prior art pumps capable of uniformly pumping fluids which contain gas are disclosed in Patents such as FI 67591, U.S. Pat. No. 4,410,337, U.S. Pat. No. 5,039,320, FI 73023, FI 75912. Said pumps are so called MC-pumps developed for pumping high consistency (about 5% to 20%) pulp which must be fluidized in the suction channel of the pump, whereby air is separated through shear and centrifugal forces. The separated air concentrates in the center of the pump and is discharged by various means. Due to the small separation volume and high viscosity of the fluids to be pumped the separation of liquid and gas is not complete in the prior art pumps mentioned above. Consequently, separation of solid material and liquid from the discharged air is further required as taught for instance in Patent Applications EP 337394 and EP 298442.

International Patent Application published as WO 92/03613 discloses a stock feeding arrangement and process wherein a fiber suspension is pumped by means of "modified" versions of the MC-pumps mentioned above. However, the specification does not explain how these pumps are to be modified.

Other means for separating gas from fluids, or for pumping fluids containing or developing vapor are disclosed in Patents such as U.S. Pat. No. 2,575,568, U.S. Pat. No. 3,203,354, U.S. Pat. No. 3,323,465, U.S. Pat. No. 3,856,483, U.S. Pat. No. 4,201,555, U.S. Pat. No. 3,942,961, U.S. Pat. No. 4,600,413, U.S. Pat. No. 4,908,048, EP 430636, WO 90/13344 and WO 93/01875.

Co-pending patent applications FI 922283 and PCT/FI93/00212 by the same inventor disclose a gas separating pump capable of separating air and water from a mixture thereof. Said pump comprises a hollow stationary shell and a central rotor having vanes rotating close to the wall of said shell for causing said mixture to rotate in a thin fluid layer along the large gas separation surface provided by said stationary shell wall. As the mixture is rotated by said vanes along said wall, gas separates from the liquid and is collected in the center of the apparatus. While said apparatus provides an improvement over previously known gas separating pumps, it is not suitable for separating gas from more viscous fluids such as papermaking stock. Moreover, when pumping easily foaming fluids, some foaming may take place as the vanes drag the liquid along a stationary surface. Dragging the liquid along said surface also consumes energy. Thus, there is still a need for improving the art of gas separation during the pumping of a fluid.

SUMMARY OF THE INVENTION

The object of the present invention is to improve the function of known processes and apparatuses in order to enable an essentially complete separation of gas from a liquid or a liquid suspension.

An object of the invention is also to provide the liquid or liquid suspension to be pumped essentially free of gas and the gas essentially free of liquid.

An object of the invention is to provide a technically simple and energy efficient pump which can remove gas such as air essentially totally from a low viscosity liquid such as water or a higher viscosity liquid or liquid suspension such as papermaking stock and separate the liquid or suspension essentially completely from the removed gas.

An object of the invention is further to provide a pump which does not influence the incoming flow of fluid to the pump and which is substantially self adjusting according to the incoming flow within a function range.

An object of the invention is further to provide a self adjusting gas separating pump, the function range of which can easily be adjusted by adjusting its speed of rotation.

An object of the invention is further to provide a gas separating pump, which can be connected to a vacuum source, and particularly so that the pump can be connected between the vacuum source and the suction object.

An object of the invention is also to provide a means for extinguishing foam and to pump foaming liquid while separating gas from said the liquid.

The object of the invention is further to provide a process and apparatus for separating gas in combination with pumping.

Particularly the object of the invention is to enable fast and controlled recycling of backwater of a paper or board forming process to the fiber process without the need for a separate deaeration.

Another object of the invention is to enable air separation and controlled processing of fluid material separated by flotation.

It is an object of the invention to effectuate the said objects in a manner which is highly energy efficient and which allows handling of fluids within a large viscosity range.

An object of the invention is also to enable air separation from papermaking stock before its introduction into the short circulation, thereby rending superfluous separate deaeration devices.

The present invention and basically relates to an apparatus for pumping a fluid mixture of a gas and a liquid or a liquid suspension and for separating said gas and said liquid or suspension from each other, said apparatus having a fluid inlet at one end and at the opposite end a pump housing with a liquid outlet and, between said inlet and said pump housing, a hollow elongated gas separation part of an essentially circular cross-section with a generally central outlet for separated gas, said apparatus including means for causing said mixture to rotate. In said apparatus said gas separation part is provided by a hollow rotor between said inlet and said pump housing, the inner wall of said rotor providing a large rotatable gas separation surface. By using said apparatus it is possible to provide an essentially complete separation of said gas from said fluid mixture.

The rotor of the apparatus according to the present invention preferably has a generally tubular configuration and comprises at its outlet end a significantly larger diameter pumping zone extending into said pump housing. The best performance is generally obtained with an embodiment, wherein said rotor at the inlet has blades for rotating said incoming mixture and at the outlet ends in a larger diameter blade wheel extending into said pump housing.

In a specific embodiment of the invention there are means provided for spraying a fluid against the gas separation surface, and the gas outlet may be connected to a vacuum source to provide vacuum in the gas separation par or upstream of the gas separating pump.

The present invention also relates to a process for pumping a fluid mixture of a gas and a liquid or a liquid suspension so that said gas and said liquid or suspension separate from each other. Said process comprises the steps of feeding said fluid mixture into the inlet of a gas separation pump having a hollow rotatable gas separation part with a circular cross-section; bringing said mixture into rotation at the inlet end of said gas separation pump for causing said mixture to flow towards the wall thereof; maintaining said mixture in rotation by rotating said gas separation part; causing said mixture to flow along a rotating gas separation surface formed by the wall of said gas separation part to form a fluid layer on said gas separation surface; maintaining said flow on said rotating gas separation surface for a sufficient time to allow said gas to separate from said liquid or liquid suspension and to form a gas column at the center of said gas separation part; causing said separated liquid or liquid suspension to flow along said rotating gas separation surface into a pumping zone connected to said gas separation part and causing said liquid to form a rotating liquid ring in said pumping zone; and discharging said liquid from said pumping zone and discharging said gas from said gas column. Said pumping zone preferably has a larger diameter than said gas separation part.

In the preferred embodiment said fluid mixture comprises essentially a mixture of air and water which are substantially completely separated from each other. In order to provide a good separation of the gas, it is important that at least at the end of the gas separation part said mixture is made to flow in an essentially stable flow on said gas separation surface to form a fluid layer thereon. The thickness of said layer is preferably less than $\frac{1}{4}$ of the diameter of said gas separation part, more preferably less than $\frac{1}{6}$ of said diameter. In separating air and water the fluid layer will generally be even thinner than $\frac{1}{6}$ of said diameter.

The fluid layer has an open surface, and the flow thus corresponds to the flow in an open channel. Depending on each particular case, the layer thickness is chosen and set to cause the flow to be either rapid or tranquil in the gas separation part. A controlled transition from rapid to tranquil flow is preferably arranged before the fluid enters the pumping zone.

A preferred embodiment of the process is provided by connecting the gas discharge to a vacuum source which may be used either to improve the effect of gas separation in the pump or as a means of suction in a process upstream of the pump. When said fluid mixture is a mixture of a gas and a liquid suspension it may be made to boil by a vacuum caused by said suction, whereby gas entrained in said mixture will be essentially completely removed.

The process according to the invention is basically self-adjusting. However, at need the depth of said liquid ring is adjusted by means of adjusting the speed of rotation.

In another preferred embodiment of the invention foam floating on the gas separation surface is extinguished by spraying fluid into the central gas column.

The present invention, together with additional objects and advantages thereof will be best understood from the following description, when read in connection with the accompanying drawings, of which:

BRIEF DESCRIPTION OF DRAWINGS

FIG. 4 shows a section of a gas separation pump according to another embodiment of the invention seen from the side;

FIG. 5 shows a section of a gas separation pump according to a preferred embodiment with foam extinction nozzles of the invention seen from the side;

DETAILED DESCRIPTION OF THE PREFERRED EMBODIMENT

In the following detailed description of the invention reference is made to the drawings, wherein the same numerals are used for the same or functionally similar parts.

Figure 1:
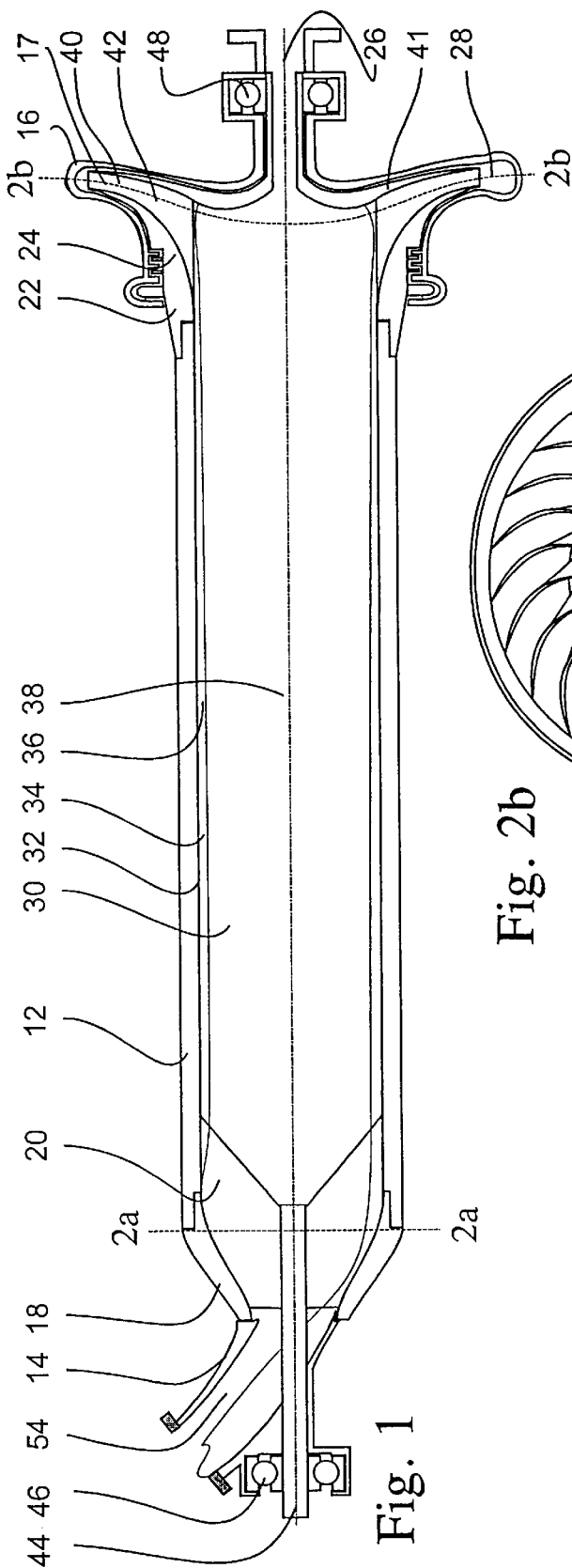
FIG. 1 shows a section of a gas separation pump according to a preferred embodiment of the invention seen from the side.

In the preferred embodiment of the invention according to FIG. 1 the gas separation pump according to the invention comprises an essentially hollow tubular rotor 12 with a stationary fluid inlet 14 at one end 18 and a stationary pump housing 16 at the opposite end 22. At said inlet end 18 of said rotor 12 there is a set of blades 20 extending from the rotor wall towards the center of said rotor 12. At said outlet end 22 there is a blade wheel 24 with blades 42. The pump housing 16 has an outlet for gas and peripheral liquid discharge pipe 28.

The central part of said rotor 12 forms a rotatable elongated tubular gas separation part 30, the inner wall of which provides a large separation surface 32. The gas separation part 30 shall, according to the invention, be sufficiently long for allowing sufficient time for the fluid fed through inlet 14 and any possible sprays resulting from the action of blades 20 at the inlet end 18 of the apparatus to settle at said separation surface 32, and for any gas enclosed in said fluid to separate, as said fluid flows from inlet to outlet in said rotor 12. In order to provide said time and to obtain a favorable ratio between axial flow at said separation surface and the centrifugal force causing the separation, the diameter of separation part 30 should be relatively small compared to the length of said separation part 30. Thus the separation part 26 should have a diameter D which is smaller than the length L of said separation part. Said diameter D should preferably be smaller than half the length L. A preferred ratio of D to L is from less than 1:2 up to 1:20 or more. There is in actual fact no definite limit to the length of said separation part, except for possible technical difficulties encountered in having extremely long rotating devices.

The gas separation surface shall, according to the invention, be sufficiently large for allowing the fluid in said rotor 12 to settle in a fluid layer 34 on the surface 32 of said gas separation part 30. In said thin fluid layer 34 the distance for the gas to reach the surface 36 of the fluid is short and an effective gas separation will take place.

In the center of said rotor 12 the separated gas forms a gas column 38 surrounded by said fluid surface 36. Said layer 34 gradually releases all contained gas and transforms into a gas free layer of liquid or liquid suspension.

Due to the rotation of said rotor 12 fluid layer 34 is caused to rotate rapidly in said separation part 30 and is subject to centrifugal forces, which cause the enclosed gas bubbles in the fluid-gas mixture to raise rapidly to the surface 36 of the mixture and from there towards the center of the forming gas column 38.

In order to avoid uncontrolled turbulence and sprays at said inlet end 18 of said rotor 12, said blades 20 are at this point preferably shaped in a spiral form which follows the natural flow path of the fluid when accelerating.

At said outlet end 22 said rotor 12 enlarges smoothly into a pumping zone 17 having a blade wheel 24. During use of the apparatus the separated liquid or liquid suspension (hereinafter for short referred to merely as "liquid") forms a deeper liquid ring 40 in said blade wheel 24 which causes the accumulating pressure at the periphery of the pump housing 16 to increase and the liquid, now essentially free of gas, to be discharged through liquid discharge pipe 28.

In order to avoid instable flow conditions, a controlled transition from rapid to tranquil flow may be obtained by the insertion of a threshold ring (not shown) on the gas separation surface 32 at the portion where said transition is desired.

If the flow, which is pumped through discharge pipe 28 is smaller than the flow arriving through inlet 14, the depth of liquid ring 40 will increase, increasing at the same time the pumping pressure and, consequently, the outlet flow will increase. The gas separation pump according to the invention is thus self adjusting within certain limits. The pressure of the pumped liquid can also be adjusted by adjusting the rotational speed of the rotor 12, and thus the range of self adjustment can be set to meet prevailing operating conditions.

In the embodiment according to FIG. 1 the separation part 30 smoothly transforms into a larger diameter pumping zone 17 without any distinct transition point. The diameter of said pumping zone 17 is preferably significantly larger than the diameter of the gas separation part 30 so that a distinct widening of the apparatus is provided for receiving the degassed liquid and to form a sufficiently deep liquid ring 40 to allow pumping of the liquid without disturbing the surface of said liquid ring. Thus, the most preferred embodiment of the invention is obtained, wherein the rotor 12 enlarges smoothly like a funnel from a separation part 30 to a pumping zone having a blade wheel 24. Thanks to the smooth construction the liquid layer 34 will flow without disruption from separation part 30 to pumping zone 17. A violent transition might cause a disruption of the laminar flow and cause gas to mix into the liquid already freed from gas.

In order to avoid violent acceleration at the transition area between separation part and pumping zone, where the gas column might enlarge, it is favorable to let the blades 42 of blade wheel 24 follow a spiral path at this point.

Even if the funnel-like shape of rotor 12 represented by FIG. 1 is considered the most preferred embodiment of the invention, the geometrical shape of the separation part 30 is not limited to this form. The invention functions also if the separation part is shaped like a cone or has an intermediary shape.

In the embodiment of FIG. 1 the blade wheel 24 has an end shield 49 for preventing the stationary back wall 41 of pump housing 16 from generating turbulence in liquid ring 40. Said end shield 49 is provided with holes 47 permitting the liquid pressure building up between end shield 49 and back wall 41 to be discharged into liquid ring 40.

In order to provide a large and stable gas column 38 in said gas separation part 30, and also a large surface 36 of fluid layer 34, permitting an efficient gas separation, the gas column 38 should occupy a significant portion, preferably not less than half of the available volume of the gas separation part 30 of rotor 12. The fluid layer 34 should remain relatively thin, preferably less than one fourth and even more preferably below one sixth or less of the diameter D of the gas separation part, whereby the centrifugal forces cause only a modest pressure build up in said fluid layer 34, and excessive compression of the gas bubbles enclosed in said fluid layer is avoided.

In order to have a thin fluid layer in separation part 30 and still obtain a desired pumping pressure in pump housing 16, the diameter of the pumping zone 17 and blade wheel 24 are preferably significantly larger than that of gas separation part 30. Even if the most preferred embodiment as presented in FIG. 1, is the one wherein the fluid layer 34 in separation part 30 is shallow compared to the liquid ring 40 in pumping zone 17, the invention functions also if the difference in depth between separation part 30 and pumpin zone is smaller.

At the pump housing 16 there is a central gas outlet 26 through which the gas accumulating in gas column 38 is removed. The gas is always removed from the gas column 38 and preferably at the pump housing 16, where the liquid has essentially totally been separated from the gas. The gas outlet may alternatively be arranged centrally or decentrally through the pump housing 16 or through a tubular shaft of rotor 12 through either end. According to the invention, even a counter flow gas removal through inlet 14 is possible.

In the embodiment of FIG. 1, the rotor 12 is driven (by driving means not shown) by a shaft 44 at said inlet end 18. Said shaft 44 extends through said inlet 14 in bearing 46. At the opposite end said blade wheel 24 extends into a bearing 48 incorporated into pump housing 16. In other embodiments of the invention, the shaft 44 may be arranged to go through the entire rotor 12 and to pass through both inlet 14 and pump housing 16, or the shaft may be connected to the blade wheel 24 or otherwise to the outlet end of rotor 12 only. The support of rotor 12 may also be arranged at one end only or even through bearings arranged at ts central part. Many technical solutions are available, as will be appreciated by those skilled in the art.

Figure 2B:
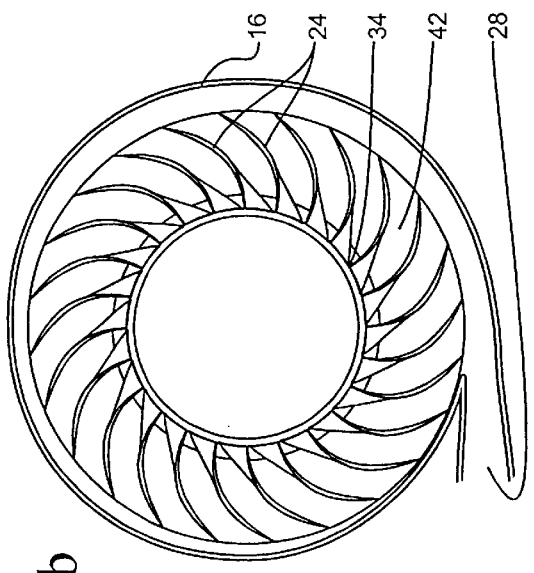
FIG. 2b shows a section of the gas separation pump of FIG. 1 along line B—B.
Figure 2A:
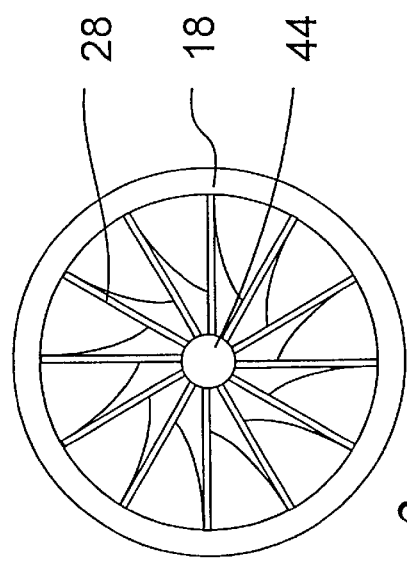
FIG. 2a shows a section of the gas separation pump of FIG. 1 along line A—A.

FIG. 2a shows a section A—A of the pump of FIG. 1, which shows the preferred spiral shape of blades 20 of inlet end 18 of rotor 12. The spiral form of blades 20 and a tangential feeding of the mixture of gas and liquid allow a smooth acceleration of the fluid, avoiding excessive turbulence.

The spiral blades 20 cause the fluid to flow against the periphery of inlet end 18 leaving space for gas at the center of said inlet end, so that gas column 38, as can be seen in FIG. 1, extends through said blades into inlet 14.

FIG. 2b represents a section B—B at the outlet end of the pump of FIG. 1. FIG. 2b shows the pump housing 16 with its larger diameter, the outlet 28 which extends in a spiral form around the pump housing 16 and the liquid ring 40 formed during use in said pump housing. In the center of the pump housing 16 the inner diameter of the liquid ring 40 varies according to the operating conditions, remaining within certain limits in equilibrium with the rotational speed of blade wheel 24, the pressure at the outlet 28 and flow of fluid through said pump.

Figure 3:
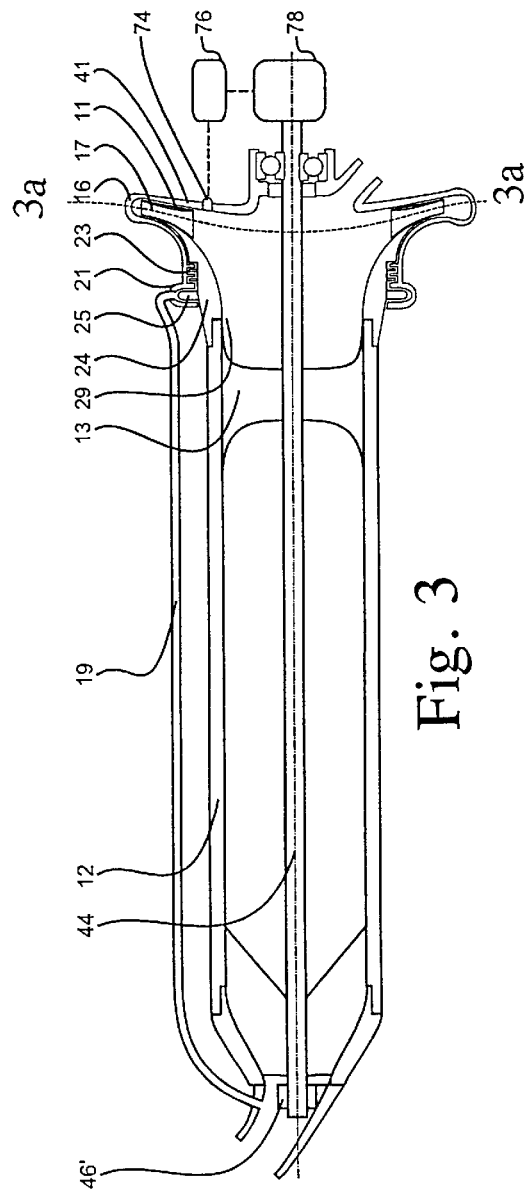
FIG. 3 shows a similar section to FIG. 1 of another embodiment of the present invention including alternative and optional features.

FIG. 3 shows an embodiment of the invention corresponding largely to the embodiment of FIG. 1 but showing various optional embodiments that may be used in the construction of the apparatus according to the present invention. Thus, in the shown embodiment shaft 44 passes through the entire length of rotor 12. Bearing 46' provided at inlet end 18 is of a type which is lubricated by the in flowing fluid, such bearings being known to those skilled in the art. Outlet end 22 of rotor 12 is supported by blades 13 forming vanes at the downstream end of said separation part 30. Rotor 12 ends in a channel-like pumping zone 17 limited by an annular plate 11 attached to the blades 42 of blade wheel 24.

In the transition zone between gas separation part 30 and pumping zone 17 the wall of said rotor 12 has an annular shoulder 29 decreasing the inner diameter of said rotor 12. Shoulder 29 allows a control of the depth of fluid layer 34 flowing along said gas separation surface 32 and hence the retention time. The bubbles may need a minimum retention time in order to unite into larger enough bubbles to penetrate all the way to the surface 36.

Between the rotating blade wheel 24 and the stationary pump housing 16 there is a labyrinth sealing 23 of a known type. Said seal 23 minimizes leakage from liquid ring 40 to the outside space. At the end of sealing 23 there is a larger ring 25 for causing liquid leaking through labyrinth sealing 23 to rotate in an exit chamber 21. A pipe 19 is provided for conducting leaking fluid from exit chamber 21 back to inlet 14. There are numerous other ways of sealing the pump housing 16, as will be obvious to those skilled in the art.

FIG. 3 further shows a pressure sensor 74 attached to back wall 41 of pump housing 16 for sensing the pressure of liquid ring 40 in the pump. A process control system is indicated by box 76 and an adjustable speed drive is indicated by box 78. The rotational speed of rotor 12 may be adjusted accordingly so that the depth of liquid ring 40 in pump housing 16 can be kept within the limits of self control.

Figure 3A:
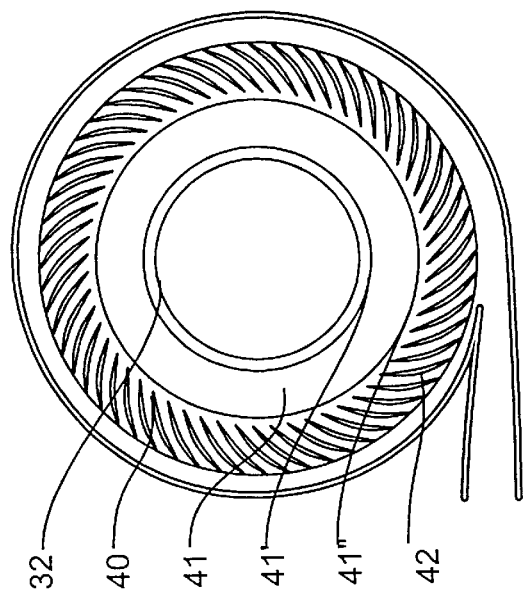
FIG. 3a shows a section of the gas separation pump of FIG. 3 along line C—C.

FIG. 3a shows a section along line C—C in FIG. 3 wherein the hatched ring 43 indicates the span of self-adjusting inner surfaces of liquid ring 40; surface 43' indicates the biggest depth; and surface 43" indicates the smallest depth of said liquid ring. In this embodiment blades 42 of blade wheel 24 are so short that they remain completely covered by liquid ring 40. It is to be noted that the blade wheel to be used in the present invention may be executed in various ways known to those skilled in the art. Thus, said blade wheel may have closed channels or blades open in either direction, or it may even totally lack vanes or blades.

FIG. 4 shows another embodiment of the invention. In this embodiment the exterior of inlet 14 and pump housing 16 are connected together by a shell 15 enclosing rotor 12 in a housing. Said rotor 12 has an open inlet end 18 extending into bearing 46 incorporated into inlet 14. The outlet end comprises a driving shaft 45 for said rotor, the blades 42' of blade wheel 24 extending to the center of blade wheel 24. Gas outlet 27 extends decentrally from the wall of pump housing 16.

In a preferred embodiment of the invention gas outlet 26 or 27 is connected to a vacuum source (not shown), so that the gas cumulating in gas column 38 may be removed by suction. The vacuum causes the gas bubbles enclosed in the fluid layer 34 to expand, thus increasing their flow speed towards the liquid surface 36 and into gas column 38. If the applied vacuum is deep enough, it causes the liquid in fluid layer 34 to boil, whereby also dissolved gas is liberated and removed from the liquid.

In the embodiment of FIG. 4 shell 15 together with inlet 14 and pump housing 16 forms a closed chamber to which vacuum can be applied through gas outlet 27, whereby the vacuum acts through outlet 27, rotor 12 and inlet 14 upstream. Through this embodiment leakage of air from the environment into the vacuum can be minimized.

The advantages of the gas separation pump according to FIG. 4 will be especially evident when said pump is used in a paper making process and the vacuum needed for drainage at the papermaking machine forming fabric is caused by suction through the gas outlet 27 of the pump. The vacuum at the forming fabric can be applied either through the inlet pipe 14 or through a separate suction pipe (not shown) connected to said gas separation pump.

A stable flow of backwater to said pump may be provided either by feeding the drained backwater to said pump through an inlet pipe so spacious that the backwater surface always remains open, or by keeping the inlet pipe constantly full of water when applying vacuum at the forming fabric through said separate suction pipe.

FIG. 5 represents a preferred embodiment of the apparatus for separating gas and pumping the essentially gas free liquid when the fluid mixture is a foam or strongly tends to form foam. The apparatus is in other respects essentially similar to the embodiment of FIG. 4 but the shaft 45' is hollow, constituting a feeding pipe for spraying fluid into gas column 38 through nozzles 70 arranged in the outlet end of rotor 12. Alternatively spray nozzles (not shown) may be incorporated into a shaft passing through the entire rotor or into the pump housing 16 in a way, explained in copending patent application WO 93/23135 incorporated herein by reference. A combination of different types of spray nozzles is contemplated within the scope of the present invention. Droplets 72 sprayed from the nozzles and hitting the surface 34 cause foam on this surface to collapse.

For the apparatus aspect of the present invention it is above all essential that a large rotating gas separation surface is provided in separation part 30 so that a thin rotating fluid layer 34 can be formed on said rotating surface. Gas separated by means of the centrifugal forces is collected into a distinct central gas column 38, from where it is removed. The large rotating separation surface is provided by the elongated separation part 30 of rotor 12 having a length substantially exceeding its diameter.

In a preferred application of the invention in a papermaking process it is further essential that suction needed for other purposes can be applied through the present apparatus.

According to the process of the present invention a mixture of gas and a liquid or a liquid suspension is separated into an essentially gas-free liquid and an essentially liquid-free gas. The liquid is a low viscosity liquid like water or a higher viscosity liquid or suspension like fiber stock. The gas is air or another gas substantially lighter than the liquid component of the mixture. Thus, the liquid may contain fibers or impurities such as ink particles to an amount, which does not, however, make the fluid mixture excessively viscous.

In the process aspect of the present invention a gas/liquid mixture is fed for instance into the gas separation pump of FIG. 1 through inlet 14. The mixture is brought into rotation by blades 20 of rotor 12 so that it is slung onto the gas separation surface 32 formed on the inner wall of rotor 12 in gas separation part 30. Thus a rotating fluid layer 34 is formed on said rotating surface.

Due to the centrifugal forces caused by said rotation, the lighter gas enclosed in the heavier liquid strives out from the liquid towards the center of the apparatus, forming a gas column 38. Correspondingly the heavier liquid droplets collect at the gas separation surface 32 of rotor 12 and form a liquid layer 34 on said gas separation surface. The enclosed gas will easily pass through the relatively thin fluid layer 34, separate from the liquid and transfer into the gas column 38 in the center of the apparatus.

The layer thickness and flow speed in the separation part are inversely proportional and, consequently, as long as the layer is kept thin, variations in the layer thickness do not materially affect the gas separation efficiency. The flow speed in the gas separation part may thus be chosen according to any particular case so that any heavy material striving to settle on the gas separation surface 32 will be flushed away by the fluid flow.

The liquid flows continuously from the inlet end 18 towards the outlet end 22 along the separation surface of the rotating separation part 30, reaching blade wheel 24 which is smoothly connected to said separation part 30. The diameter of rotor 12 increases at the transition between separation part 30 and blade wheel 24, whereby the rotating, now essentially gas-free liquid is pressed toward the periphery of the pump housing 16, forming a liquid ring 40 therein. Due to centrifugal forces said liquid ring 40, is pressed into liquid outlet 28, which extends as a spiral around the periphery of pump housing 16, and is discharged.

The lighter gas, correspondingly, collects into the center of the rotating apparatus, and forms a gas column 38, limited towards the rotating fluid 34 by a fluid surface 36. From this gas column 38 the gas can be removed and thus separated from the liquid. The gas may be discharged either through a gas outlet 26 in the pump housing 16 or through the rotor shaft in either outlet or inlet direction.

The depth of liquid ring 40 in pump housing 16 automatically adjusts, within certain limits, to the flow of entering fluid so that a pumping pressure sufficient for pumping the liquid forward is obtained. The more fluid that enters the pump the deeper the liquid ring and the higher the pumping pressure. The depth of the liquid ring as a function of the pressure difference can be adjusted by adjusting the rotational speed of the rotor. By adjusting the rotational speed, the depth of the liquid ring can be adjusted according to the flow of incoming gas and liquid mixture and the required pumping pressure. Within certain limits the pump is self-adjusting. Without disturbing the process, the depth of liquid ring 40 in pump housing 16 can vary within a relatively large range. As long as fluid layer 34 is not disrupted, no gas enters liquid outlet 28 and no significant amount of liquid enters gas outlet 26.

A suction source may be connected to the gas outlet 26 for improving the gas separation. Such use of a suction source is particularly preferred when suction is needed at the source of the mixture of gas and liquid. Due to the open gas column 38 formed in the center of the pump being in direct connection with a void space 54 in inlet 14, the suction applied at gas outlet 27 will affect also equipment upstream of the pump. Particularly in the case when the mixture contains considerable amounts of gas, so that it rather consists of liquid droplets in an aerosol, the flow speed of the mixture can be increased by connecting suction to a pump according to the invention.

Foam flowing into the pump or forming therein concentrates on the surface 36 of the fluid layer 34 and collapses rapidly due to the centrifugal forces, whereby the gas is liberated and strives towards the center. Particularly stable foam may be extinguished by directing sprays 52 of a fluid, such as a liquid, towards the surface 36 of fluid layer 34. Spray nozzles are designed to spray the fluid within the void space of gas column 38.

Figure 6:
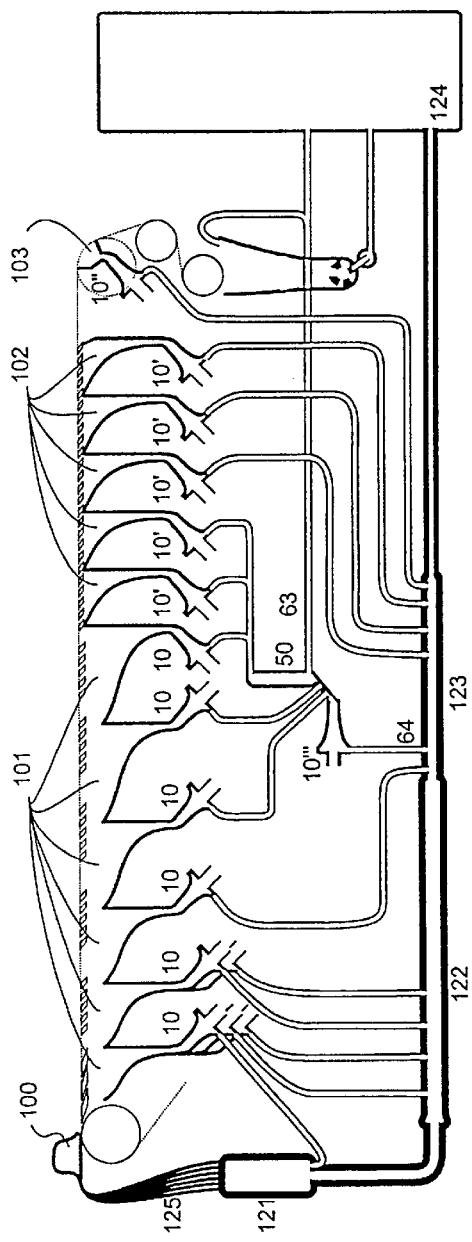
FIG. 6 shows the use of gas separation pumps according to the invention in a preferred papermaking process.

The gas separation pump according to the present invention is especially well suited for recycling paper machine backwater into the short circulation fiber process. FIG. 6 represents a particularly favorable use of gas separation pumps in a process according to copending patent application WO 93/23612, corresponding to granted FI Patent 89728, by the same inventor. The disclosure of said application is incorporated herein by reference. It is obvious for the person skilled in the art that the present invention offers significant improvement also to conventional papermaking processes, by increasing recycling speed of backwater and eliminating the need for huge backwater tanks.

The solution according to FIG. 6 represents a papermaking process, where thin stock is fed through a head box 100 onto a forming wire, for the forming of a web. Backwater draining through the forming wire is collected in drainage boxes 101, suction boxes 102 and the suction roll 103 and flows directly into gas separations pumps 10, 10' and 10", according to the present invention. The gas separation pumps 10' and 10" relating respectively to suction boxes and to a suction roll may be connected to a vacuum source (not shown) for providing the suction needed in said suction boxes and said suction roll.

The gas separating pumps 10, 10' and 10" separate the air contained in the backwater and feed the backwater as separate air free flows to various dilution point in the primary fiber process. Said fiber process goes from stock preparation 124 through a mixer 123. centrifugal cleaner 122, screen 121 and stock distributor 125 to the headbox 100 and further to paper web forming.

The gas separation pumps according to the present invention, thus provide means for fast and direct recycling of essentially air free backwater into the fiber process of a papermaking machine wet end.

In the process according to FIG. 6 a part of the collected backwater is fed to a fiber recovery unit 50 which may be one designed according to co-pending patent application FI 930247 by the same inventor and incorporated herein by reference. In the fiber recovery unit fibers are separated from the backwater flow 61 by means of foaming. Clear water, essentially free from solids is discharged through clear water discharge 63 and fed out from the short circulation. The foam from said recovery unit is extinguished in a foam extinguisher and flows further into a gas separation pump 10''', which feeds the recovered stock 64, essentially free of air, directly into the fiber process.

The present invention, thus provides a means for separating air from the product of such a compact flotation process, providing a means the fast recycling of recovered fibers in the paper machine wet end. Similarly the gas separation pump according to the present invention provides a means for handling foam resulting from other flotation processes, like deinking of waste paper. Gas separation pumps for handling foam from flotation processes can favorably be of the type with integrated foam extinguishing, as represented by FIG. 5.

Figure 7:
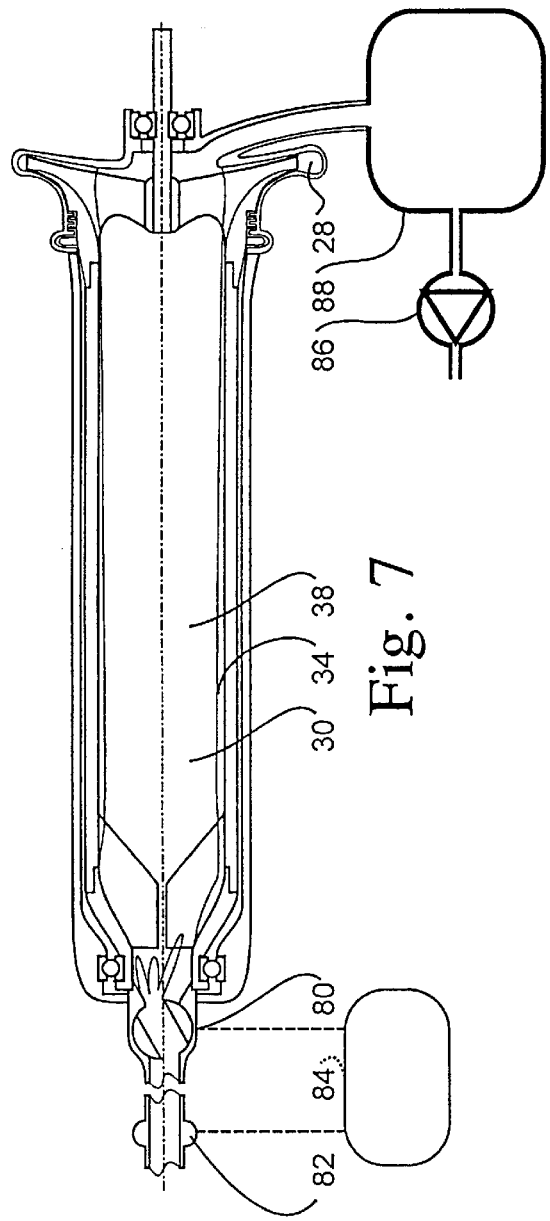
FIG. 7 shows the use of a gas separation pump according to the invention for an essentially total separation of gas when pumping a viscous slurry.

In a process according to FIG. 6 it is essential that the stock fed into the short circuit from stock preparation 124 is free from air. FIG. 7, represents a use of the present invention for removing air from viscous liquids like papermaking stock, when the air is more stably entrained by the fiber network.

In FIG. 7 paper stock is fed to a gas separation pump through an automatic control valve 80, being positioned for a controlled constant flow of stock by means of flow meter 82 and process control system 84. The gas separation pump is set under vacuum by means of a vacuum system 86, the vacuum being such that the temperature of the stock causes the stock in liquid layer 34 to boil in the rotating gas separation part 30. The boiling causes air bubbles entrained in the liquid layer 34 to expand so that they are efficiently and essentially completely removed into gas column 38 and further discharged into condenser 88 of vacuum system 86, which causes the vapor evaporated by the boiling of the stock in the pump to condense. The air removed from the stock is removed from condenser 88 by means of vacuum pump 86. The deaerated stock is discharged from the pump through stock outlet 28.

For the smooth and constant feeding of stock it is essential that the pressure difference of control valve 80 is kept constant, which on the pressure side of valve 80 is achieved by means well known to persons skilled in the art, and on the suction side by dimensioning the pump 86 and the condenser 88 abundant enough for granting a sufficient flow of vapor and air from the pump.

Similarly as for fiber recovery, flotation is used in other separation processes, as for example for the removing of ink particles from a fiber suspension resulting from pulping printed waste paper. In a deinking process the fiber suspension is typically 1 to 3% such that a relatively stable fiber network results, whereas ink particles, which have been released from the fibers by mechanical and chemical means are mobile within the fiber network and are carried out from the suspension by gas bubbles transferring the same. The products of the deinking process are a foam containing ink particles and a suspension of deinked fibers. Both of these products contain a large amount of air and are difficult to process in prior art pumps.

The foam containing ink may preferably be handled by a gas separation pump according to the present invention in the same manner as the fiber material recovered according to the process described above.

The suspension of deinked fibers resulting from a deinking flotation process is typically saturated by air and the relatively stable fiber network traps the enclosed air bubbles and makes the handling thereof in gas separating pumps particularly difficult. When such a pulp suspension saturated by air trapped by a fiber network is handled in a pump according to the present invention, the separation of gas will be only partial, but due to the huge gas separation capability and smooth flow in the pump, the pumping will be very stable and the pump will function in a self regulating manner as explained above. By setting the pump under vacuum, the fiber suspension can also be brought to boil, whereby the enclosed bubbles expand and a total separation of gas is obtained according to the process described above.

The above example shows that even if the gas separation pump according to the present invention is primarily aimed at achieving an essentially total separation of gas and liquid when pumping a liquid, the pump will also provide great advantages in processes where prior art gas separation pumps are insufficient for pumping fluids wherein the gas is very hard to separate.

The present invention has been described principally as a pump solution relating to the paper industry. It is, however, obvious for the persons skilled in the art that the pump can be used for many other purposes when gas is to be removed from a liquid or a liquid suspension, and a liquid or suspension containing gas is to be pumped substantially free of gas.

What is claimed is:

1. An apparatus for pumping a fluid mixture of a gas and a liquid or a gas and a liquid suspension and for separating said gas an said liquid or suspension from each other, said apparatus comprising:

a fluid inlet (14) at one end (18) and at the opposite end (22) a stationary pump housing (16) with a liquid outlet (28) and, between said inlet (14) and said pump housing (16), a hollow elongated gas separation part (30) of substantially circular cross-section with a substantially central outlet (26, 27) for separated gas, said apparatus including means for causing said mixture to rotate (20) disposed at said inlet end, and said gas separation part (30) being provided by a hollow rotor (12) between said inlet (14) and said pump housing (16), the inner wall of said rotor (12) providing a large rotatable gas separation surface (32), while said opposite end (22) of said apparatus widens into a pumping zone (17) having a diameter which is larger than the diameter of the gas separation part (30) immediately upstream thereof.

2. An apparatus according to claim 1 wherein said rotor (12) has a substantially tubular configuration and comprises at its outlet end (22) said pumping zone (17) having a larger diameter and extending into said pump housing (16).

3. An apparatus according to claim 2 wherein the diameter of said rotor (12) smoothly increases to form said larger diameter pumping zone (17), said rotor (12) having a blade wheel (24) extending into said pump housing (16).

4. An apparatus according to claim 1 wherein said means for causing said mixture to rotate comprise blades (20) extending from the wall of said rotor (12) towards the center thereof at said inlet end (18).

5. An apparatus according to claim 1 wherein said gas separation part (30) has a substantially tubular configuration with a diameter D which is smaller than its length L, the ratio D/L being from less than about 1:2 to about 1:20.

6. An apparatus according to claim 1 wherein said inlet (14) and said pump housing (16) are connected to each others by a shell (15), forming a closed space enclosing said rotor (12).

7. An apparatus according to claim 1 wherein said wall of said rotor (12) is provided with an annular shoulder decreasing its inner diameter.

8. An apparatus according to claim 1 wherein means (70) are provided for spraying a fluid against said gas separation surface (32).

9. An apparatus according to claim 1 wherein a vacuum source is connected to said gas outlet (26, 27).

10. A process for pumping a fluid mixture of a gas and a liquid so that said gas and said liquid separate from each other, characterized by the steps of feeding said fluid mixture into the inlet of a gas separation pump having a hollow rotatable gas separation part with a circular cross-section;

bringing said mixture into rotation at the inlet end of said gas separation pump for causing said mixture to flow towards the wall thereof;

maintaining said mixture in rotation by rotating said gas separation part;

causing said mixture to flow along a rotating gas separation surface formed by the wall of said gas separation part to form a fluid layer on said gas separation surface;

maintaining said flow on said rotating gas separation surface for a sufficient time to allow said gas to separate from said liquid or liquid suspension and to form a gas column at the center of said gas separation part;

causing said separated liquid or liquid suspension to flow along said rotating gas separation surface into a stationary pump housing having a pumping zone with a diameter larger than said gas separation part and causing said liquid to form a rotating liquid ring in said pumping zone; and discharging said liquid from said pump housing and discharging said gas from said gas column.

11. A process according to claim 10 wherein said mixture comprises a mixture of air and water which are substantially completely separated from each other.

12. A process according to claim 10 wherein said mixture is made to flow in an essentially tranquil flow on said gas separation surface to form a fluid layer having a thickness which is less than ⅙ of the diameter of said gas separation part.

13. A process according to claim 10 wherein said gas is discharged from said gas column by means of suction.

14. A process according to claim 13 wherein said fluid mixture is a mixture of a gas and a liquid suspension which is made to boil by a vacuum caused by said suction, whereby gas entrained in said mixture is completely removed.

15. A process according to claim 14 wherein said suction is applied at a gas outlet of said gas separation pump and the flow of fluid entering said inlet of said gas separation pump is controlled.

16. A process according to claim 10 wherein the depth of said liquid rind is adjusted by means of adjusting the speed of rotation of said gas separation part.

17. A process according to claim 10 wherein a spray of fluid is injected towards said layer on said gas separation surface.

18. A process according to claim 10 wherein said mixture comprises a liquid suspension.

* * * * *